United States Patent Office 3,418,343
Patented Dec. 24, 1968

3,418,343
4-ALKYL-13β-ALKYLGON-4,9-DIENES
Donald P. Strike, Philadelphia, and Herchel Smith, Wayne, Pa., assignors to American Home Products Corporation, New York, N.Y., a corporation of Delaware
No Drawing. Filed June 29, 1966, Ser. No. 561,375
5 Claims. (Cl. 260—397.5)

This invention relates to compositions of matter classified in the art of chemistry as substituted gona-4,9-dienes and a process for preparing them.

The invention sought to be patented, in a principal composition aspect, is described as residing in the concept of a 4-alkyl-13β-alkylgon-4,9-dien-17-ol.

The tangible embodiments of the principal compositions of the invention possess the inherent general physical properties of being white crystalline solids, are substantially insoluble in water, and are generally soluble in polar solvents, such as dimethylacetamide. Examination of the compounds produced according to the hereinafter described process reveals, upon infrared, ultraviolet, and nuclear magnetic resonance spectrographic analysis, spectral data supporting the molecular structure hereinbefore set forth. For example, the 4,9-unsaturation is evident in the infrared and ultraviolet and the C-4 alkyl group is evident in the nuclear magnetic resonance spectrum. The aforementioned physical characteristics taken together with the elemental analysis, the nature of the starting materials, and the mode of synthesis, further confirm the molecular structure hereinbefore set forth for the compositions sought to be patented.

The tangible embodiments of the principal composition of the invention possess the inherent applied use characteristics of exerting qualitatively varying hormonal effects in animals as evidenced by pharmacological evaluation according to standard test procedures. Such tangible embodiments possess anti-androgenic activity and in addition, the compositions of the invention possess the further applied use characteristic of being intermediates for making compositions which possess the applied use characteristic of exerting qualitatively varying hormonal effects in animals as evidenced by pharmacological evaluation according to standard test procedures.

The invention sought to be patented in a principal process of making the compositions aspect, is described as residing in the concept of reacting a 13β-alkyl-17β-hydroxygon-5(10)-en-4-one with a primary alkyl Grignard reagent and hydrolyzing the complex so-produced to obtain a 4-alkyl-13β-alkylgon-4,9-dien-17β-ol.

The manner of making and using the invention will now be generally described so as to enable a person skilled in the art of chemistry to make and use the same, as follows:

The process of the invention may be schematically represented for a specific embodiment thereof, as follows:

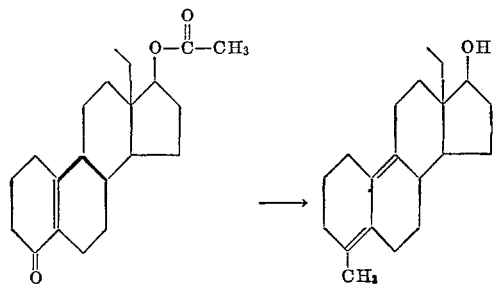

Referring to the above schematic representation, the 13-alkyl-17-hydroxygon-5(10)-en-4-one ester used as starting materials are obtained as described in co-pending U.S. application Ser. No. 551,391, filed May 19, 1966. Said starting material dissolved in a non-reactive, preferably ether type solvent such as tetrahydrofuran is added slowly to the primary alkyl Grignard reagent with cooling and stirring. Hydrolysis of the Grignard complex formed with mineral acid preferably cold dilute hydrochloric acid produces the desired corresponding 4-alkyl-13-alkylgon-4,9(10)-dien-17β-ol.

The alkyl group at the 13-position can be of varying chain length, such as for example, but not limited thereto, methyl, ethyl, propyl, isopropyl, butyl, isobutyl, pentyl, etc., and for the process and composition of the invention when such groups are present in the starting material, they will appear correspondingly in the product and are full equivalents in the process and hormonal aspect of the composition of the invention as particularly described and claimed. Similarly, the 4-primary alkyl group can be of varying chain length, such as for example methyl, ethyl, propyl, butyl, pentyl, etc.

It will also be apparent to those skilled in the art that the starting compounds can bear groups which are unaffected by the process reactions, such as for example, but not limited thereto, 6- or 7-methyl or the starting compounds can bear other groups, such as 11- or 17-hydroxy, which can be compensated for by using excess Grignard in the process of the invention and their variation in the process and hormonal applied use characteristic of the compositions of the invention are the full equivalents of the process and compositions as particularly described and claimed.

It will also be apparent to those skilled in the art that the 17-hydroxy group in the compositions as particularly described and claimed can be converted by conventional processes to 17-keto and said 17-carbonyl group converted to alkylhydroxymethylene by addition of the appropriate organo-metallic compound, or to alkynylhydroxymethylene by addition of the appropriate alkali metal acetylene. The 17-carbonyl group can also be ketalized or thioketalized by treating with the appropriate alcohol, glycol or mercaptan in a suitable solvent under acid conditions as in the presence of an acid such as sulfuric acid, p-toluene sulfonic acid, or boron trifluoride etherate with heating where necessary according to the known art. Further, the 17-hydroxy group can be converted to 17-acetyl, to 17-acyloxy esters, to 17-alkoxy, or the 17-corticoid-type groups, all in the known manner.

While the tetracyclic compounds in this specification and the appended examples are usually named to describe the configuration corresponding to that of the natural steroid, it is to be understood that the product bears the same configuration as the starting material, thus, if the starting compound is a racemic mixture, the product will also be a racemic mixture; if the starting material is a particular enantiomorph, the product will have the corresponding enantiomorphic configuration.

The following example illustrates the best mode contemplated by the inventors of carrying out the process of the invention and for preparing the compositions of the invention:

dl-4-methyl-13-ethylgon-4,9(10)-dien-17β-ol

Add a solution of 1.0 g. of dl-13-ethyl-17β-hydroxygon-5(10)-en-4-one acetate in 40 ml. of tetrahydrofuran slowly with stirring to an ice-cooled solution of 25 ml. of 3M CH₃MgBr in ether and continue stirring at room temperature for about 1 hour. Add the resulting mixture to ice-cold dilute hydrochloric acid and extract with chloroform. Wash the chloroform extract with water, dry and remove the solvent under vacuum. Chromatograph the oily residue on neutral alumina (activity 3). Elute with benzene, remove the solvent and crystallize from hexane-acetone to obtain 0.42 g. of the title compound, M.P. 128–130°

$\lambda_{max}^{KBr}$ 3.00 (s) hydroxyl 6.15 (w) (double bonds), 6.90 (s), 9.55 (s)$\mu$, $\lambda_{max}^{EtOH}$ 250 m$\mu$ ($\epsilon$ 19,600)

NMR: 97 (singlet, hydroxyl proton), 102 (singlet, C–4 methyl), 225 (triplet, C–17 proton) cps.

Analysis for $C_{20}H_{30}O$.—Calculated: C, 83.86; H, 10.56%. Found: C, 83.95; H, 10.40%.

Following the above procedure, 4-methyl-13β-methyl-gon-4,9(10)-dien-17β-ol can be prepared from 13β-methyl-17β-hydroxygon-5(10)-en-4-one and methyl Grignard reagent. 4-methyl-13β-ethylgon-4,9(10)-dien-17β-ol can be prepared from 13β-ethyl-17β-hydroxygon-5(10)-en-4-one and methyl Grignard reagent; 4-ethyl-13β-ethyl-gon-4,9(10)-dien-17β-ol can be prepared from 13β-ethyl-17β-hydroxygon-5(10)-en-4-one and ethyl Grignard reagent; 4-methyl-13β-propylgon-4,9(10)-dien-17β-ol can be prepared from 13β - propyl-17β-hydroxygon-5(10)-en-4-one and methyl Grignard reagent.

The subject matter which the applicants regard as their invention is particularly pointed out and distinctly claimed, as follows:

1. 4-alkyl-13β-alkylgon-4,9-dien-17-ol.
2. The compound of claim 1, wherein the 4-alkyl group is methyl and the 13β-alkyl group is methyl.
3. The compound of claim 1, wherein the 4-alkyl group is methyl and the 13β-alkyl group is ethyl.
4. The compound of claim 1, wherein the 4-alkyl group is methyl and the 13β-alkyl group is propyl.
5. The process for preparing a 4-alkyl-13β-alkylgon-4,9-dien-17-ol comprising reacting a 13β-alkyl-17β-hydroxygon-5(10)-en-4-one with a primary alkyl Grignard reagent and hydrolyzing the complex so-obtained.

References Cited

UNITED STATES PATENTS 3,318,922   5/1967   Windholz et al.

HENRY A. FRENCH, *Primary Examiner.*

U.S. Cl. X.R.

167—74